Jan. 31, 1967     E. W. SWEZEY     3,301,395
TEAR OPENING FOR DISPLAY PACKAGES AND METHOD OF MAKING SAME
Filed Nov. 24, 1964     2 Sheets-Sheet 1
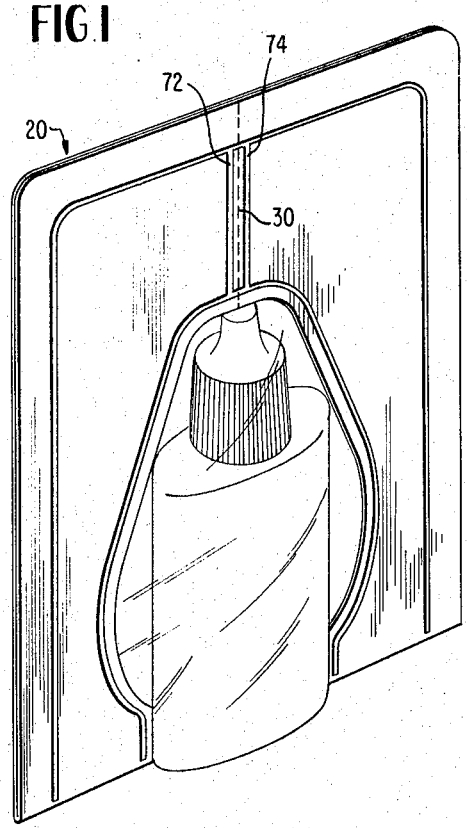
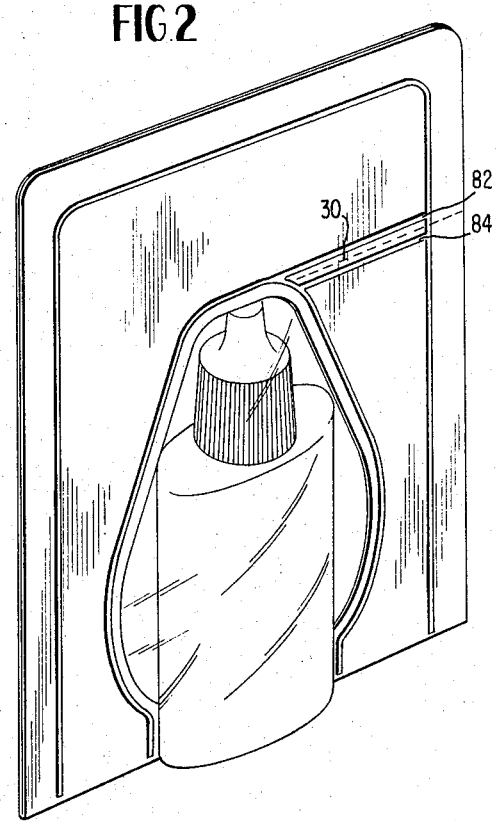
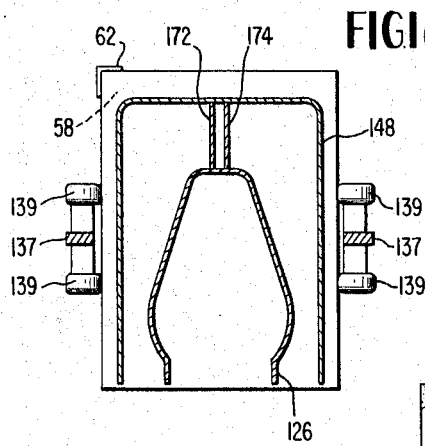
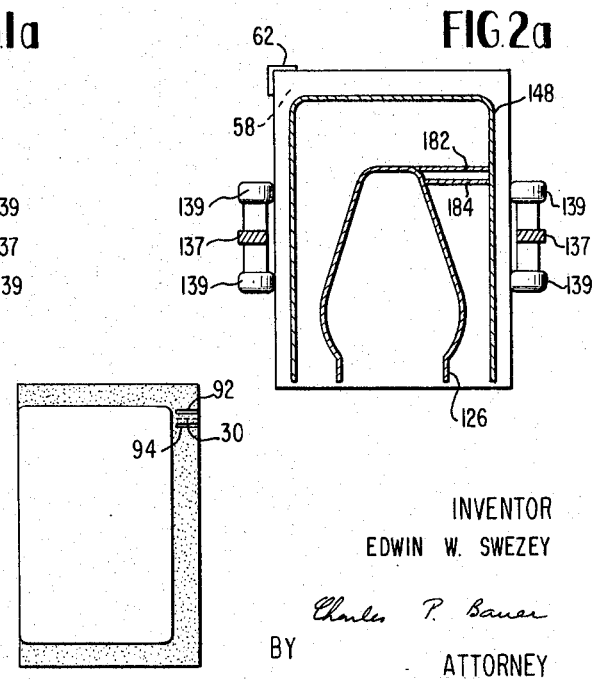
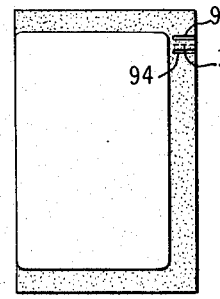
INVENTOR
EDWIN W. SWEZEY
BY Charles P. Bauer
ATTORNEY

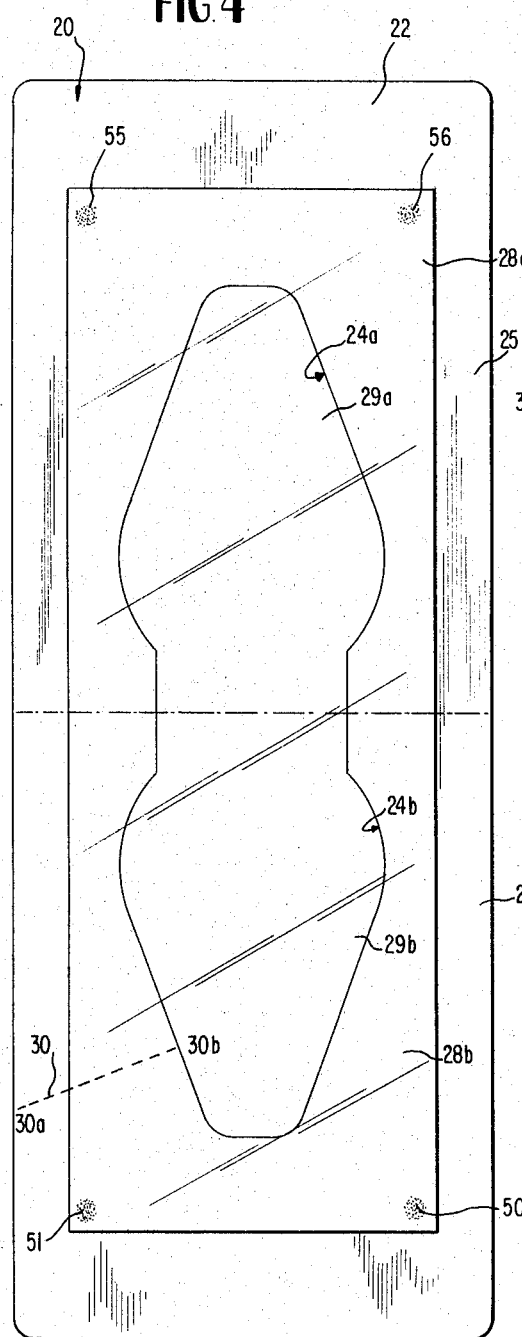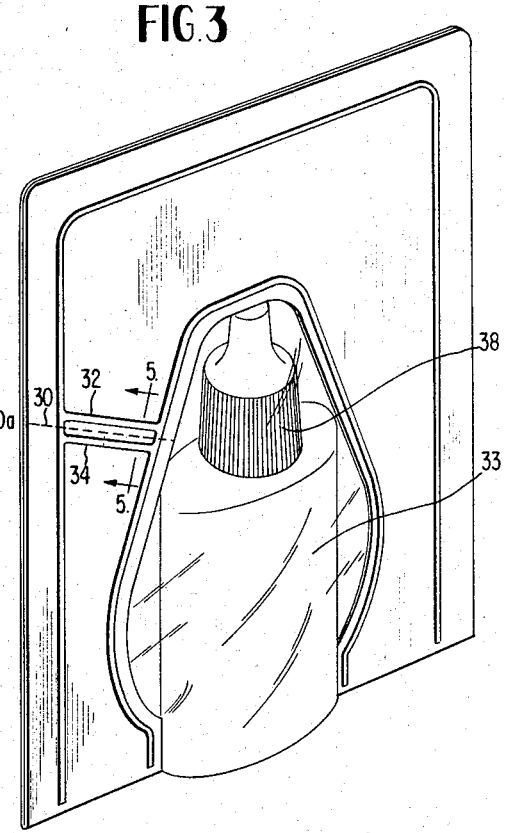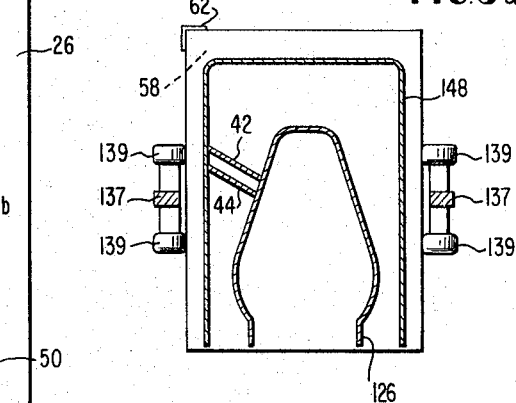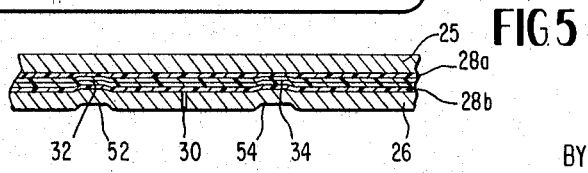

3,301,395
TEAR OPENING FOR DISPLAY PACKAGES AND METHOD OF MAKING SAME

Edwin W. Swezey, Hackensack, N.J., assignor to Union Camp Corporation, a corporation of Virginia
Filed Nov. 24, 1964, Ser. No. 413,467
13 Claims. (Cl. 206—80)

This invention relates to a novel perforated and laminated tear opening structure in wrappers or packages at least portions of which are constituted of stretchable and shrinkable plastic members, and further relates to methods of packaging articles in wrappers or packages of the above type, modified with the novel perforated tear opening structure. The laminated packages in which the tear opening is provided include heat-sealed and non-heat-sealed plastic portions and are preferably of the type shown in Swezey et al., U.S. Patent No. 3,075,330 and Crane, U.S. Patent No. 3,064,402.

More particularly, the invention relates to a perforated and laminated tear opening structure in a package consisting of a relatively stiff, sheet-like member, such as board, to which is adhered a transparent plastic stretchable membrane to provide a wall of a package, two such walls being secured together along a closing band with the board on the outside and the plastic membrane on the inside. The novel perforated structure consists of a line of perforations or indentations in one outside wall extending to an edge of the structure; and immediately adjacent both sides of the line of perforation, there are provided two bands of sealed plastic membrane, these two bands being generally parallel to the line of perforation therebetween and to each other, thereby providing a narrow channel consisting of two plies of non-sealed plastic disposed in a tear band directly opposite the perforation line, which lies between the parallel bands and extends to the edge location of the package where tearing is initiated. Effectively, the plastic is guided by perforations in the board when the fingers initiate the first tear from a location in the package which may extend, and preferably does extend, beyond the edge of the inner plastic membrane. Tearing by the fingers occurs between sealed boundaries defining the sides of the channel. As a result, the plastic which is torn is of the same thickness as nonsealed membrane material in the center of the package.

Heretofore, there has been a great deal of attention paid to quick opening structures for sealed paper-plastic laminates in the bag and package field because the prior art has recognized that serious alterations occur during sealing, particularly heat-sealing, to weaken the closure structure and plastic. A typical solution to the problem, which requires a structural modification of the tear opening perforation, is suggested by Snyder in U.S. Patent No. 2,541,674 who mentions that the perforated seal in a plastic film, such as rubber hydrochloride, is torn only with difficulty, lacks strength, frequently gives away when placed under a strain and results in a bag which is apt to be opened accidentally. Snyder discusses the problems of combining a perforated seal in the plastic with an ordinary seal in the plastic, locating the perforated seal farther from the mouth than the ordinary seal. Snyder found it necessary, in solving these problems, to introduce a line of perforations in the plastic extending from one edge of the bag to the other edge of the bag. He also found it essential to seal the bag in a separate seal which leaves an unsealed channel at each edge of the bag. The line of perforations which extends from one end of the bag to another end of the bag is located in the unsealed channel.

Another approach to the problem was taken by Schneider et al. in U.S. Patent No. 3,083,876 who was dealing with a liquid-holding container, and like Snyder, believed it to be desirable to have perforations extend through two layers of laminated material which he provided for fluid-proofing the walls of the container; e.g., metal foil-board laminate. In an embodiment in which a single layer of fluid-proofing sheet material was provided, a specially modified core layer of paperboard having fluid-proof characteristics was employed. The heat-sealed ply runs as a margin along at least one entire edge of the package in one embodiment and along three edges in another embodiment. Opening is intiated by scoring in the outer board ply which is in heat-sealing relation to the plastic therebelow.

This opening structure is to be contrasted with the present opening structure which initiates tearing in an elongated narrow zone formed of two plies of plastic membranous material face-to-face in non-sealed relation. Both Snyder, who perforates the plastic itself, and Schneider et al., who seal under heat and pressure to thin the plastic, create a weakened zone in the plastic membranous material at the perforated tear line. Schneider et al. tear through two heat-sealed plies at the tear line which provides a tear entry of the type which Snyder finds objectionable because the seal lacks strength.

The present invention avoids the weakness in Schneider et al. by eliminating sealing in the tear channel. The present invention does not perforate the plastic which Snyder finds necessary. It is surprising and unexpected that the provision of the nonsealed tear channel adjacent the perforated tear line in the paperboard can produce improved tearing into plastic membranous material even when relatively heavy weights of material are employed.

An object of the invention is to provide an improved, quick opening, perforated tear line plastic paperboard assembly which confines the perforations in a line or band on an outside paperboard ply, only one perforated outer ply being sufficient, but both outer plies may be perforated, to coact with a nonsealed elongated zone between sealed edges of the inner plastic ply, the zone being directly opposite the perforations.

A further object of the invention is to provide a novel method of manufacturing a preperforated laminated material for packaging based upon the new principle of the present invention set forth in the preceding paragraphs.

Other objects of the invention will in part be obvious and will in part appear hereinafter.

The invention accordingly comprises the several steps and the relation of one or more of such steps with respect to each of the others, and the article possessing the features, properties, and the relation of elements which are exemplified in the following detailed disclosure, and the scope of the invention will be indicated in the claims.

For a fuller understanding of the nature and objects of the invention, reference should be had to the following detailed description taken in connection with the accompanying drawings, in which:

FIG. 1 is a perspective view partly in elevation illustrating the perforated tear laminate of the invention in a package of the type shown in Crane, U.S. Patent No. 3,064,402;

FIG. 1a is a fragmentary horizontal view of the die member which is disclosed in Swezey, U.S. Patent No. 3,075,330 at FIG. 7 and described at column 6 thereof, this die member being modified to provide the heat-sealing elements forming the outlines of the tear zone, including the sealed and the unsealed elongated portions;

FIG. 2 is a modification of the location of the perforated tear laminate to permit horizontal tearing rather than vertical tearing as in FIG. 1;

FIG. 2a is the die member of the type used in FIG. 1a but with the electrode sealing pattern required for FIG. 2;

FIG. 3 is a modificaiton of the location of the perforated tear laminate showing an oblique lateral tear entry;

FIG. 3a is a die member of the type used in FIGS. 1a and 2a but with the electrode sealing pattern required for FIG. 3;

FIG. 4 is a blank showing the assembly of the board ply and plastic liner which can be used in making the packages shown in any one of FIGS. 1, 2 or 3, except that the board ply is perforated in the location as shown in FIG. 3;

FIG. 5 is a sectional view along lines 5—5 of FIG. 3 to illustrate the non-sealed tear zone opposite the perforated tear line of the invention; and FIG. 6 shows a conventional opaque multi-ply package embodying the novel tear line laminate of the invention.

In FIGS. 1–3 and 1a–3a, respectively, the packages are made by the apparatus and method of Swezey Patent No. 3,075,330 and, for convenience, the same reference numerals are applied for the package (FIGS. 1–3) and for the apparatus die unit (FIGS. 1a–3a).

The blank of FIG. 4 is designated generally by the numeral 20 and comprises a stiff foldable supporting sheet board 22 having an opening 24a and 24b in each of the halves 25 and 26, respectively, while overlying the major portion of the surface of the card and these openings is a stretchable, shrinkable, generally thin plastic sheet 28. The portion of the plastic sheet, portion 29a, spans opening 24a, and the portion of the sheet 29b spans and closes over the opening 24b.

The plastic membrane 28 for the blank of FIG. 4 may consist of a suitable resinous composition such as polyvinyl chloride, polypropylene or polyethylene. For the opaque package of FIG. 6, the plastic membrane may consist of polyethylene, cellulose acetate or rubber hydrochloride. Other films which might be mentioned are polyhexamethylene adipamide (nylon), polyvinylidene chloride and copolymer (Saran) and the like. In general, these commercially available plastic sheet materials are available from the manufacturer in any thickness desired and are readily stretched and formed after being heated to the exact extent desired, whereafter the plastic is heat-shrunk to return to its smallest possible size. After this heat-shrinking, the plastic membrane stretches itself taut about the enrobed object which, in the present illustration, is bottle 33 fitted with screw cap 38, the bottle standing upright in the package.

The particular association of the bottle in the pack heat-shrunk for enrobing is that which is described and claimed in Crane application Serial No. 233,171, filed October 3, 1962, now Patent No. 3,185,295 which is a division of Serial No. 780,564, now Patent No. 3,064,402.

In accordance with the invention, the sealing electrode pattern of FIG. 3a is modified to provide parallel elongated bands of sealing shown as 32 and 34, in the cross sectional view of FIG. 5 These elongated bands 32 and 34 lie on opposite sides and constitute the lateral boundaries of the tear line 30. The heat-sealed band 34 results from the application of heat and pressure of the electrode portion 44 bearing against the folded-over board top 26. Similarly, electrode portion 42 provides heat-sealed band 32. On the outer side of the heat-sealed band 32, which will be seen by viewing the blank of FIG. 4 after the bottom 26 is folded upwardly to constitute the top of the package viewed in the flat condition, there are two embossed portions resulting from the deformation of this top board. Each embossed portion has a width which corresponds to the width of the respective electrode elements. The embossed portion 52 made by electrode 42 lies directly in front of the two heat-sealed plies of plastic material, 28a and 28b at band 32. The embossed portion 54 made by electrode 44 lies directly in front of the two heat-sealed plies 28a and 28b at the sealed band 34.

Between the inner edge of the embossed strip portion 52 and the inner edge of the embossed portion 54 there is defined the width of a zone of non-sealed plastic plies 28a and 28b and it is along the middle of this zone that the line of perforation 30 lies. The line of perforation 30 extends from 30a, the extreme edge of the package, into 30b, the extreme interior of the package, and is wholly contained within the board material 22.

In the embodiment shown in FIG. 1, the embossed zones are shown as 72 and 74, respectively, these embossed zones being made by electrode portions 172 and 174, respectively.

In the embodiment shown in FIG. 2, the embossed elongated zones are shown as 82 and 84, respectively, these embossed zones being made by electrode portions 182 and 184, respectively.

The heat sealer structure (FIGS. 1a–3a) is identified with the same reference numerals as in Swezey, Patent No. 3,075,330; and as stated in this patent, the blanks are fed into component receiving station, heating station, membrane-forming station, article loading station, component folding station, fastening station, membrane shrinking station and discharge station.

In each of FIGS. 1a, 2a and 3a, the blank half 26 is shown in squared alignment with the sides of the corner member 62 and the holder 58 serves as the base against which the shaping heater electrodes 126 and 148 form the respective inner and outer heat seals of the package.

As described in Swezey Patent No. 3,075,330, these generally U-shaped heater electrodes are provided with holders and the plate is furnished with rollers 139 (on brackets 137) to permit an automatic opening and closing operation by cylinder piston arrangement under the control of solenoid valves.

In FIG. 6, there is illustrated an opaque, preperforated, laminated package which is adapted to be manufactured by available commercial machinery and can also be readily manufactured by the machinery shown in Swezey Patent No. 3,075,330.

The tear line structure is identical to that in each of the other figures. The package consists of opaque paper sheet material preperforated along a single tear line 30 extending from an edge and in nonheat-sealed facing relation to the outer board sheets, two inner plies of plastic sheet material, an elongated zone embracing the nonheat-sealed sheets along the length of the preperforation line, the lateral edges 92 and 94 of said elongated zone each being heat-sealed and each being generally parallel to the line of perforation which extends to the outer edge of the package. All of the unfolded edges of the package are otherwise heat-sealed to provide access only through the perforation line. It will be understood that the line of perforation must either stop short of the inner contents of the package or must begin a short distance in from the outer edge to prevent leakage of the contents through perforations.

In view of the foregoing description and the illustrations in the drawing, it will be seen that the novel perforated and laminated tear opening structure of the invention can be utilized equally well in opaque packages of the type shown in FIG. 3 of Schneider et al., Patent No. 3,083,876, which deals with fluid-impervious opaque heat sealed packages for packing loose bulk liquid or fluent materials; or in display packages of the type shown in Crane U.S. Patent No. 3,018,879; or in display packages of the type shown in Crane U.S. Patent No. 3,064,402, whether these are stand-up packages or of the type which are suspended from a hook.

The perforations have been illustrated and disclosed in an outer wall of the package or wrapper which consists of paperboard material, but it is obvious that the paperboard may be modified to render it waterproof to a greater degree, as for example, by facing the outer surface with a thin metal foil layer which may vary in thickness from 0.004" to 0.001". The paperboard may be of the plastic coated type based upon cellulose fibers which have been treated with wet-strength resinous agents and coated with suitable waterproofing synthetic resin. It is expected that the paperboard will bear printing, must be pleasing in appearance, can be completely moisture-proof and will include materials of sufficient strength and adequate design to perform the packaging and display functions.

It is an important advantage of the invention that its advantages can be achieved with an enormous variety of different kinds of plastic enrobing materials. The stock plastic material, even if high-melting, is assembled on the board blank as shown in FIG. 4 by adhering the plastic sheet to the blank along its entire peripheral edge portion or by merely heat-spotting at the corners, e.g. at points 50, 51, 55 and 56, any ordinary hot metal ball-ended instrument being suitable to prepare the blank.

In forming the packages described herein it has been found that heat-sealing provides the most uniform bounding with the least mess in securing together the outer edges of the halves of the supporting board. However, it will be understood that such halves may be secured together by any suitable adhesive.

At each of the stages of manufacture, ordinary cutting machinery can be used to form the display structure. The problems of accidental opening which have plagued the art heretofore are eliminated. The problems of weakened plastic due to perforations therein are also eliminated.

Since certain changes in carrying out the above method, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A method of manufacturing perforated and laminated tear opening structures in packages at least portions of which are constituted of stretchable and shrinkable plastic sheet members sealed to each other and to outer paperboard sheet members comprising: cutting a line of perforations in the paperboard sheet member constituting the outer wall of the package, said line of perforations extending from an outside edge of said wall along a line into the interior portion of the package which extends beyond the edge of the inner ply of plastic sheet material thereunder; sealing an elongated band on each side of said line of perforations under heat and pressure to bond the inner plastic sheets along said band to each other and to the outer paperboard walls while the width of inner plastic plies between said sealed bands and directly opposite said line of perforations is left unsealed in respect to both the inner plastic plies and the outer paperboard plies to thereby define a quick tear opening confined to the line of perforations extending from the edge of the outer wall of the package into the interior plastic plies and along the unsealed portions confined between the two sealed elongated bands.

2. A method as claimed in claim 1 wherein said package is a display package and is formed by enrobing an article defining the contents within a cut-out portion of the outer paperboard wall.

3. A method as claimed in claim 1 wherein the contents of the package are in bulk form and the outer paperboard wall completely covers the inner plastic plies to provide an opaque package.

4. A method as claimed in claim 2 wherein the display package contains a bottle and is a stand-up package and wherein the laminated tear opening extends vertically from the enrobed top of the display opening to the top edge of the package.

5. A method as claimed in claim 2 wherein the display package contains a bottle and is a stand-up package and wherein the laminated tear opening extends laterally from a side of the top of the enrobed display opening to the nearest side edge of the package.

6. A method as claimed in claim 2 wherein the display package contains a bottle and is a stand-up package and wherein the laminated tear opening extends obliquely from a side of the enrobed display opening to the nearest side edge of said package.

7. In a package consisting of stretchable and shrinkable plastic sheet members sealed to each other and to an outer paperboard sheet, that improvement in perforated, laminated tear opening structure consisting of a line of perforations in said paperboard sheet constituting the outer wall of said package, said line of perforations extending from an outside edge of said wall along a line into the interior portion of the package which extends beyond the edge of the inner ply of plastic sheet material thereunder, elongated bands on each side of said line of perforations sealed under heat and pressure to bond the inner plastic sheets along said bands to each other and to the outer paperboard walls while leaving an elongated zone of inner plastic plies between said bands which lies directly opposite said line of perforations in unsealed condition, this unsealed elongated zone setting the direction of tearing into the inner plies of plastic when said perforated line is torn inwardly starting at the outer edge of the package.

8. A package as claimed in claim 7 wherein the outer paperboard walls completely cover the inner plastic plies and provide an opaque package.

9. A package as claimed in claim 7 wherein the outer paperboard walls are provided with a cutout portion and the inner plastic plies are sealed to enrobe an article which is displayed by said package.

10. A package as claimed in claim 9 wherein the laminated tear opening extends vertically from the enrobed top of the display article to the top edge of the package.

11. A package as claimed in claim 9 wherein the laminated tear opening extends laterally from one side of the top of the enrobed display article to the nearest side edge of the package.

12. A package as claimed in claim 9 wherein the laminated tear opening extends obliquely from a side of the enrobed display package to the nearest side edge of the package.

13. A method of manufacturing a tear opening package from stretchable and shrinkable plastic sheet members sealed to each other and to outer paperboard sheet members constituting: a blank supplied to a retailer or packager by a supplier, said blank including a line of perforations in the paperboard sheet member constituting the outer wall portion of the resulting package, said line of perforations extending from an outside edge of said wall along a line into the interior portion of the blank which extends beyond the edge of the inner ply of plastic sheet material thereunder comprising the step of sealing an elongated band on each side of said line of perforations under heat and pressure to bond the inner plastic sheets along said band to each other and to the outer paperboard walls while the width of inner plastic plies between said sealed bands and directly opposite said line of perforations is left unsealed.

References Cited by the Examiner

UNITED STATES PATENTS

| | | | |
|---|---|---|---|
| 2,329,360 | 9/1943 | Salfisberg | 229—51 |
| 2,622,986 | 12/1952 | Snyder et al. | 229—66 |
| 2,946,434 | 7/1960 | Brina | 206—56 |
| 3,171,581 | 3/1965 | Kugler | 229—53 |

THERON E. CONDON, *Primary Examiner.*

WILLIAM T. DIXSON, JR., *Examiner.*